T. CRUMLING.
Thrashing Machine.
No. 85,368.  Patented Dec. 29, 1868.
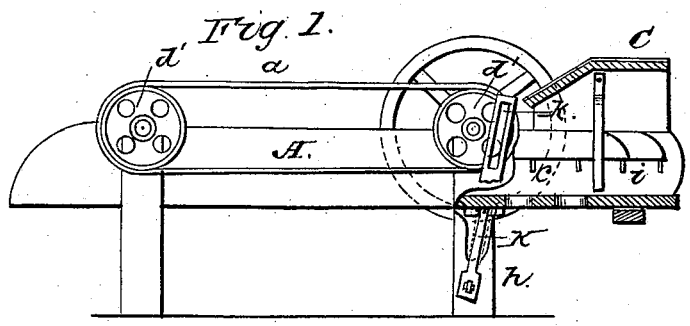
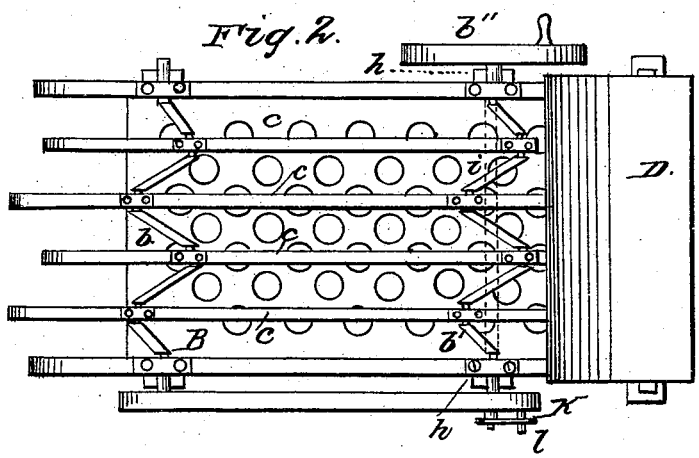

TOBIAS CRUMLING, OF CROSS-ROADS, PENNSYLVANIA.

Letters Patent No. 85,368, dated December 29, 1868.

IMPROVEMENT IN SEPARATORS FOR THRESHING-MACHINES.

The Schedule referred to in these Letters Patent and making part of the same.

*To all whom it may concern:*

Be it known that I, TOBIAS CRUMLING, of Cross-Roads, in the county of York, and State of Pennsylvania, have invented a new and improved Separator for Threshers; and I do hereby declare that the following is a full, clear, and exact description of the construction and operation of the same, reference being had to the accompanying drawings, (making a part of this specification,) in which—

Figure 1 is a side elevation, one end of the shed on the front part of my separator being removed.

Figure 2 is a plan view.

This invention is intended for an attachment to a threshing-machine, and has for its object to separate straw from grain after both have passed through a thresher.

It consists of the common form of straw-carriers—that composed of alternate vibrating reciprocating beams, operated by crank-shafts, in combination with a reciprocating winnowing-board, and a series of suspended fingers between the said beams, for the purpose of preventing the escape of straw in the wrong direction.

In the drawings—

A represents the sides, and

B, the bottom of an ordinary winnower, transversely of which, one at each end of the winnowers, pass two shafts, $b$ $b'$, with reverse cranks, the cranks of one shaft corresponding with those of the other, and each pair of shanks being connected by a beam, $c$, said cranks and beam constituting the ordinary straw-carrier.

The shaft $b'$ is rotated by means of a crank-wheel, $b''$, and communicates motion to the shaft $b$ through the wheels $d$ $d'$ and belt $a$.

Transversely between the legs $h$ $h$ of the winnower, passes a shaft, $i$, to one end of which, outside of the leg $h$, is rigidly attached the lower extremity of a connecting-rod, $k$, which has a slot, $k'$, at its upper end, through which passes a pin, $l$, projecting from the side of the wheel $d$, by means of which wheel, pin, slot, and connecting-rod, an oscillating motion is imparted to the shaft $i$, which motion is communicated from said shaft to the winnower B through a connecting-rod, not shown, rigidly attached to the shaft $i$, and jointed to the under side of the winnower.

On the front end of the winnower, is a small shed, C, with a roof sloping toward the carrier, in order to receive the straw from the same.

To prevent any straw from passing off under the roof, fingers, $d$, are hinged to the roof of the shed C, and hung between the beams $c$.

After the straw has passed through the thresher, it falls upon the beams $c$, and is by them conveyed away, such kernels of grain as may have passed through with it falling through upon the winnower B, and passing through the holes in that to a receptacle beneath.

Having thus described my invention,

What I claim as new, and desire to secure by Letters Patent, is—

The straw-carrier $b$ $b'$ $c$, in combination with the winnower B, the fingers $d$, the connecting-rod $k$, and shaft $i$, as and for the purpose specified.

TOBIAS CRUMLING.

Witnesses:
J. G. CRUMLING,
JAMES PROUDFIT.